(12) United States Patent
Kume et al.

(10) Patent No.: US 6,225,414 B1
(45) Date of Patent: May 1, 2001

(54) PROPYLENE BLOCK COPOLYMER

(75) Inventors: Takanori Kume; Kazuki Wakamatsu; Eisuke Shiratani, all of Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 08/868,539

(22) Filed: Jun. 4, 1997

(30) Foreign Application Priority Data

Jun. 4, 1996 (JP) .................................................. 8-141358

(51) Int. Cl.⁷ .................................................. C08F 297/08
(52) U.S. Cl. ........................... 525/243; 525/269; 525/270; 525/323
(58) Field of Search ..................... 525/323, 269, 525/270, 243

(56) References Cited

U.S. PATENT DOCUMENTS

| | | | |
|---|---|---|---|
| 4,547,552 | * 10/1985 | Toyota et al. | 525/247 |
| 4,751,265 | * 6/1988 | Asanuma et al. | 525/53 |
| 5,055,528 | * 10/1991 | Kioka et al. | 525/270 |
| 5,654,372 | * 8/1997 | Sadatoshi et al. | 525/270 |
| 5,756,587 | * 5/1998 | Bettonville et al. | 525/323 |

FOREIGN PATENT DOCUMENTS

| | | |
|---|---|---|
| 0 588 581 A2 | 3/1994 | (EP) . |
| 56 84 7 1 2 * | 7/1981 | (JP) . |
| 56-84712 | 7/1981 | (JP) . |
| 03 56 5 7 0 B2 * | 8/1991 | (JP) . |
| 04 20 24 0 9 * | 7/1992 | (JP) . |
| 4-202409 | 7/1992 | (JP) . |
| 6-93061 | 4/1994 | (JP) . |

* cited by examiner

Primary Examiner—Jeffrey C. Mullis
(74) Attorney, Agent, or Firm—Birch, Stewart, Kolasch & Birch

(57) ABSTRACT

A polypropylene block copolymer obtained by producing an ethylene-propylene copolymer moiety as a component A having an ethylene content of 1.5 to 6.0% by weight in an amount of 40 to 85% by weight based on the total weight of components A and B in the absence of an inert solvent, substantially, in a first step, with a Ziegler-Natta catalyst, and then producing an ethylene-propylene copolymer moiety as a component B having an ethylene content of 7 to 17% by weight in an amount of 15 to 60% by weight based on an amount of the whole polymer in a gas phase in a second step, wherein an intrinsic viscosity ($[\eta]B$) of the component B is from 2.0 to 5.0 dl/g and the ratio of the intrinsic viscosity ($[\eta]B$) of the component B to an intrinsic viscosity ($[\eta]A$) of the component A is within the range of 0.5 to 1.8.

15 Claims, No Drawings

PROPYLENE BLOCK COPOLYMER

BACKGROUND OF THE INVENTION

1. Field of the Invention

The present invention relates to a propylene block copolymer. More particularly, it relates to a propylene block copolymer which is superior in flexibility, transparency and impact resistance at low temperature.

2. Description of the Related Arts

A crystalline propylene polymer (herein-after, referred to as simply as "propylene polymer") has widely been used in the fields of films, sheets, containers, etc. because of excellent heat resistance and rigidity.

In the medical field such as infusion bag, etc. and food packaging field, materials having a good flexibility, transparency, impact resistance and heat resistance have recently been required. A propylene homopolymer is superior in heat resistance, but is inferior in flexibility, transparency and impact resistance at low temperature. A random copolymer of propylene and α-olefin is superior in transparency, but is insufficient in impact resistance at low temperature and, therefore, use thereof is limited.

Some trials of improving the impact resistance using a propylene block copolymer have been made.

JP-A-56-084712 discloses a polypropylene block copolymer composed of a propylene ethylene copolymer block as a moiety A and a propylene ethylene copolymer block as a moiety B, characterized in that a melt flow index suitable for an air-cooling inflation method is from 0.01 to 0.3 g/10 minutes, an ethylene content of the moiety A is less than 20% by weight and an ethylene content of the moiety B is not less than 20% by weight. Specifically, a polymer polymerized by a solvent method is disclosed but is not sufficient in transparency. Namely, in Comparative Example of it, there is disclosed a composition having an ethylene content of the moiety A of 4.6% by weight, an ethylene content of the moiety B is 13.9% by weight and a content of the moiety B of 17.7% by weight. Although the transparency is improved by reducing the ethylene content, the impact strength at low temperature is insufficient.

JP-A-06-093061 discloses an ethylene-propylene block copolymer obtained by producing a polymer moiety (component A) which is mainly composed of propylene in the absence of an inert solvent, substantially, in a first step, and then producing an ethylene-propylene copolymer moiety (component B) in a gas phase in a second step, using a Ziegler-Natta catalyst. The ethylene content of the component (B) is from 20 to 50% by weight and the impact resistance at low temperature is good, but the transparency is insufficient.

The present inventors have intensively studied to solve drawbacks of the conventional ethylene-propylene block copolymer. As a result, the problems above can be solved by a specific block copolymer obtained by polymerizing in the absence of the solvent, substantially.

SUMMARY OF THE INVENTION

An object of the present invention is to provide a polypropylene block copolymer having a good transparency and improved impact resistance at low temperature.

According to the present invention, there is provided a polypropylene block copolymer obtained by producing an ethylene-propylene copolymer moiety as a component A having an ethylene content of 1.5 to 6.0% by weight in an amount of 40 to 85% by weight based on the total of components A and B, in the absence of an inert solvent, substantially, in a first step, with a Ziegler-Natta catalyst, and then producing an ethylene-propylene copolymer moiety as a component B having an ethylene content of 7 to 17% by weight in an amount of 15 to 60% by weight based on an amount of the total of components A and B in a gas phase in a second step, wherein the intrinsic viscosity ($[\eta]B$) of the component B is from 2.0 to 5.0 dl/g and the ratio ($[\eta]B/[\eta]A$) of the intrinsic viscosity ($[\eta]B$) of the component B to the intrinsic viscosity ($[\eta]A$) of the component A is within the range of 0.5 to 1.8.

Herein, this block copolymer composed of components A and B strictly means a composition composed of the components A and B because the greater part of the component A is not chemically bonded with the component B in the block copolymer. This composition is referred to as "block copolymer" in the present specification.

DETAILED DESCRIPTION OF THE INVENTION

The polypropylene block copolymer of the present invention is a block copolymer obtained by producing an ethylene-propylene copolymer moiety (component A) having an ethylene content of 1.5 to 6.0% by weight in the absence of an inert solvent, substantially, in a first step, with a Ziegler-Natta catalyst, and then producing an ethylene-propylene copolymer moiety (component B) having a different ethylene concentration in a gas phase in a second step.

The proportions of the component A and the component B are from 40 to 85% by weight and from 15 to 60% by weight based on the total weight of components A and B, respectively.

When the proportion of the component B is less than 15% by weight, the impact resistance at low temperature becomes poor. On the other hand, when it exceeds 60% by weight, the heat resistance decreases. In case of using for film applications, particularly, it is more preferred that the proportion of the component B is from 17 to 27% by weight from view point of the moldability.

In order to obtain the ethylene-propylene block copolymer wherein the proportion of the component B is from 17 to 27% by weight, it is possible to produce a block copolymer wherein the proportion of the component B is from 17 to 27% by weight in the polymerization step. It is also possible that an ethylene-propylene block copolymer wherein the proportion of the component B is from 27 to 60% by weight is produced by polymerization and only the component A obtained by carrying out the only first step polymerization may be added to the block copolymer in melt-kneading to adjust the proportion of the component B.

The ethylene content of the component A produced in the first step is from 1.5 to 6.0% by weight. When the ethylene content is less than 1.5% by weight, the flexibility is reduced. On the other hand, when it exceeds 6.0% by weight, the heat resistance is reduced. The ethylene content of 2.5 to 4.5% by weight is more preferred from the view point of a balance between the flexibility and heat resistance.

The ethylene content of the component B produced in the second step is from 7 to 17% by weight. When the ethylene content is less than 7% by weight, the impact resistance at low temperature is deteriorated. On the other hand, when it exceeds 17% by weight, the transparency is deteriorated. The ethylene content of 8 to 12% by weight is more preferred from the view point of a balance between the impact resistance at low temperature and transparency.

The intrinsic viscosity ($[\eta]B$) of the component B is from 2.0 to 5.0 dl/g, and the ratio ($[\eta]B/[\eta]A$) of the intrinsic viscosity ($[\eta]B$) of the component B to the intrinsic viscosity ($[\eta]A$) of the component A is from 0.5 to 1.8, in view of the transparency. When the $[\eta]B$ is less than 2.0 dl/g, the proportion of a low-molecular weight component is increased and, therefore, it is not preferred. On the other hand, when it exceeds 5.0 dl/g, the fluidity and processability of the ethylene-propylene block copolymer become poor. The intrinsic viscosity of the $[\eta]B$ of the component B of the ethylene-propylene copolymer is preferably from 2.5 to 4.0 dl/g, in view of a balance between the inhibition of the low-molecular weight component and processability.

When the ratio of the $[\eta]B$ to the $[\eta]A$ ($[\eta]B/[\eta]A$) is more than 1.8 or less than 0.5, the compatibility of the component A to the component B is deteriorated and the transparency is deteriorated. The ratio of the $[\eta]B$ to the $[\eta]A$ ($[\eta]B/[\eta]A$) is preferably from 0.8 to 1.5, in view of the transparency.

Moreover, the polypropylene block copolymer of the present invention is preferred that the content of a component having a molecular weight of not more than 26000 as a soluble fraction in xylene at 20° C. in the whole polymer is not more than 6% by weight because the amount extracted by hexane or the like can be controlled to a low value. When the block copolymer is used as a material for food packaging, particularly, the content of the component having a molecular weight of not more than 26000 in the block polymer is more preferably not more than 3.5% by weight.

In the polypropylene block copolymer of the present invention, the difference (EB–EA) between the ethylene content (EB) (% by weight) of the component (B) and the ethylene content (EA) (% by weight) of the component (A) is from 3 to 15 (% by weight). When the difference (EB–EA) is less than 3 (% by weight), the impact resistance at low temperature is deteriorated. On the other hand, when it exceeds 15, the transparency is deteriorated. The difference (EB–EA) is preferably 5 to 10 (% by weight), in view of a balance between the transparency and impact resistance at low temperature.

The polypropylene block copolymer of the present invention can be produced by a batch-wise polymerization method of copolymerizing propylene and ethylene in a predetermined amount and ratio as the component A, with a Ziegler-Natta catalyst and then copolymerizing propylene and ethylene in a predetermined amount and ratio as the component B, in the same polymerization vessel, or a continuous polymerization method of continuously producing the component A and component B by polymerization with said catalyst using a polymerization reactor composed of at least two vessels connected in series.

Specifically, the propylene block copolymer of the present invention can be produced by producing the ethylene-propylene copolymer moiety (component A) with feeding hydrogen to adjust the molecular weight of propylene-ethylene copolymer moiety to be produced in the absence of the inert solvent, substantially, in the first step, with a Ziegler-Natta catalyst and then producing the ethylene-propylene copolymer moiety (component B) with feeding propylene, ethylene and hydrogen in the gas phase in the second step under the conditions of the polymerization temperature of 20 to 150° C., preferably 50 to 95° C., and the polymerization pressure of atmospheric pressure to 40 Kg/cm$^2$G, preferably 2 to 40 Kg/cm$^2$G.

As the Ziegler-Natta catalyst, there can be used a known Ziegler-Natta catalyst. Preferably, the catalyst comprises at least titanium, magnesium and halogen as essential components, and for example, there may be illustrated olefin polymerization catalysts disclosed in EP-A-244,678, EP-A-657473, U.S. Pat. Nos. 4,900,706, 4,983,561, 4,672,050 or the like.

One example of the olefin polymerization catalysts comprises:

(a) a solid catalyst component containing a trivalent titanium compound, which is obtained by treating a solid product obtained by reducing a titanium compound represented by the general formula Ti $(OR_1)_nX_{4-n}$ ($R_1$ represents a hydrocarbon group having 1 to 20 carbon atoms, X represents a halogen atom, and n represents a numeral satisfying the expression: $0<n\leq4$) with an organomagnesium compound in the presence of an organosilicon compound having an Si—O bond and, if necessary, an ether compound, with an ester compound and then treating a ester-treated solid with a mixture of an ether compound and titanium tetrachloride or a mixture of an ether compound, titanium tetrachloride and an ester compound;

(b) an organoaluminum compound; and (c) a silicon compound having an Si—$OR_2$ bond ($R_2$ represents a hydrocarbon group having 1 to 20 carbon atoms).

The molar ratio $[(b)/(a)]$ of an Al atom in the component (b) to a Ti atom in the component (a) is usually 1 to 2000, preferably 5 to 1500, and the molar ratio $[(c)/(b)]$ of the component (c) to the Al atom in the component (b) is usually 500 or less, preferably 0.02 to 500, more preferably 0.05 to 50.

The fluidity represented by melt flow rate of the polypropylene block copolymer of the present invention can be changed by a known method, for example, by melt-kneading the copolymer in the presence or absence of an organic peroxide. For example, there is exemplified a method of adding a peroxide such as 2,5-dimethyl-2,5-di-tertiary butylperoxy)hexane, etc., followed by mixing with a Henschel mixer and further melt-kneading at 250° C. to adjust MFR. It is also possible to contain antioxidants, ultraviolet absorbers, antistatic agents, anti-fogging agents, nucleating agents, etc., if necessary.

The propylene block copolymer of the present invention can be used alone or in combination with a different resin or resin composition.

The propylene block copolymer of the present invention is suitable as materials for film, sheet, shaped container or the like.

In the production of film and sheet, it is possible to form a single film of the block copolymer of the present invention or a film of the block copolymer as at least one layer of a multi-layer constructed with a layer of a different resin, by a conventional film-forming method such as an inflation method, a T-die method, a calendering method, or the like. Multi-layer films can be also obtained by a conventional lamination means such as an extrusion laminating method, a heat laminating method, a dry laminating method, or the like.

It is also possible to use the resulting film and sheet after uniaxially or biaxially stretching by a roll stretching, a tenter stretching, a tubular stretching, or the like. It is also possible to subjecting to a surface treatment such as corona discharge treatment, flame treatment, plasma treatment, ozone treatment or the like, which is normally used in industrial.

The propylene block copolymer of the present invention is particularly suitable as a specific layer of a film for food packaging and a film or retort food packaging in view of the transparency, heat resistance and impact resistance at low temperature, and is also suitable as a material of a bag for medical liquid in view of transparency, heat resistance and flexibility.

Further, the propylene block copolymer can be formed into bottles by blow molding, containers by vacuum forming or pressure forming or the like, etc. or various shaped articles by injection molding or the like. The formed article may be used alone or used as at least one layer of a multi-layer article with different resins. It is particularly suitable as a squeeze bottle for food and domestic article and a medical bottle.

EXAMPLES

The present invention will be explained in detail with the following Examples, but limited thereto.

Measurement of the respective items in the DETAILED DESCRIPTION OF THE INVENTION and Examples was conducted in the following manner.

(1) Content of Component A and Component B (% by weight)

The contents (PA) of the component A and the content (PB) of the component B were determined from material balance of the component A and component B in polymerization.

(2)-1 Intrinsic Viscosity ($[\eta]$)

It was measured in tetralin at 135° C. by using an Ubbelode viscometer.

(2)-2 Intrinsic Viscosity ($[\eta]A$, $[\eta]B$) of component A and component B

The intrinsic viscosity $[\eta]B$ of the component B was determined from the intrinsic viscosity $[\eta]A$ measured after the completion of the polymerization of the component A of the first step, intrinsic viscosity $[\eta]AB$ measured after the completion of the polymerization of the second step, content (PA) of the component A and content (PB) of the component B according to the following equation:

$$[\eta]A \times PA/100 + [\eta]B \times PB/100 = [\eta]AB.$$

(3) Ethylene Content

It was measured according to the 13C-NMR method described in page 616 of Polymer Handbook (1995, published by Kinokuniya Shoten).

Ethylene concentration (EA, EB) of component A and component B

The ethylene concentration EB of the component B was determined from the ethylene concentration measured after completion of the polymerization of the component A of the first step, ethylene concentration EAB measured after completion of the polymerization of the second step, content (PA) of the component A and content (PB) of the component B according to the following equation:

$$EA \times PA/100 + EB \times PB/100 = EAB$$

(4) Melt Flow Rate (MFR)

It was measured by the method of the condition-14 according to JIS K7210.

(5) Soluble Fraction in Xylene at 20° C. (CXS)

After 5 g of polypropylene was completely dissolved in 500 ml of boiled xylene, the solution was cooled to 20° C. and allowed to stand for 4 hours or more. The resultant was filtered to separate into a deposit and a filtrate, and then the filtrate was dried at 70° C. under reduced pressure and then weighed.

(6) Melting Point (Tm)

A sample (10 mg) was molten under a nitrogen atmosphere at 220° C. for 5 minutes, using a differential scanning calorimeter (DSC, manufactured by Perkin Elmer Co.), and then cooled to 40° C. at a cooling rate of 5° C./minute. After heating at a heating rate of 5° C./minute, a peak temperature of a maximum peak of the resulting melting endothermic curve was taken as a melting point (Tm).

Incidentally, the melting point of indium (In) measured at the heating rate of 5° C./minute using this measuring apparatus was 156.5° C.

(7)-1 Izod Impact Strength (Press Sheet)

It was measured at 0° C. according to JIS-K-7110.

(7)-2 Film Impact Strength

An impact strength of the film was measured at −10° C. by a film impact tester manufactured by Toyo Seiki Co., Ltd., using a semi-spherical impact head.

(8) Transparency (Haze)

It was measured according to JIS K7105.

(9) Low-molecular Weight Component

The CXS component was measured by G.P.C. (gel permeation chromatography) under the following conditions. A calibration curve was made by using standard polystyrene.

Model: 150CV (manufactured by Milipore Waters Co.)
Column: Shodex M/S 80
Measuring temperature: 145° C.
Solvent: ortho-dichlorobenzene
Sample concentration: 5 mg/8 ml The content of the component having a molecular weight of not more than 26000 by using this molecular weight distribution, and then evaluation was conducted according to the following criteria.

◯: content is less than 2.6% by weight
Δ: content is between 2.6 to 6.0% by weight
X: content exceeds 6.0% by weight

(10) Flexural Modulus

It was measured according to JIS-K-7203.

Example-1

[Synthesis of Solid Catalyst]

After the atmosphere in a SUS reaction reactor (200 L) equipped with a stirrer was replaced with nitrogen, hexane (80 L), tetrabutoxytitanium (6.55 mol), diisobutyl phthalate (2.8 mol) and tetraethoxysilane (98.9 mol) were introduced to form an uniform solution. Then, a diisobutyl ether solution (51 L) of butylmagnesium chloride (concentration: 2.1 mol/L) was added dropwise over 5 hours with maintaining the temperature in the reactor at 5° C. After completion of the dropwise addition, the mixture was stirred for 1 hour, subjected to solid-liquid separation at room temperature and thus separated solid washed three times with toluene (70 L). After adding toluene so that the slurry concentration becomes 0.2 Kg/L, diisobutyl phthalate (47.6 mol) was added and the reaction was carried out at 95° C. for 30 minutes. After completion of the reaction, the reaction mixture was subjected to solid-liquid separation to obtain a solid product and washed twice with toluene. Then, diisobutyl phthalate (3.13 mol), butyl ether (8.9 mol) and titanium tetrachloride (274 mol) were added and the reaction was conducted at 105° C. for 3 hours. After the completion of the reaction, the reaction mixture was subjected to solid-liquid separation at the same temperature and thus obtained slid was washed twice with toluene (90 L) at the same temperature. After the slurry concentration was adjusted to 0.4 Kg/L, butyl ether (8.9 mol) and titanium tetrachloride (137 mol) were added and the reaction was conducted at 105° C. for 1 hour. After completion of the reaction, the reaction mixture was subjected to solid-liquid separation at the same temperature, and thus obtained solid was washed three times with toluene (90 L) at the same temperature, washed three times with hexane (70 L) and dried under reduced pressure to obtain 11.4 Kg of a solid catalyst component. The solid catalyst component contained 1.8% by weight of a titanium atom, 20.1% by weight of a magnesium atom, 8.4% by weight of a phthalate, 0.3% by weight of ethoxy group and 0.2% by weight of butoxy group, and showed a good particle property containing no fine powders.

[Production of Polymer]

<Preliminary Activation of Solid Catalyst Component>

To a SUS autoclave (inner volume: 3 L) equipped with a stirrer, n-hexane (1.5 L) dehydrated and deaerated sufficiently, triethylaluminum (37.5 mmol), t-butyl-n-propyldimethoxysilane (37.5 mmol) and the above solid catalyst component (15 g) were added. After preliminary activation was conducted by continuously feeding propylene (15 g) over about 30 minutes with maintaining the temperature in the reactor at 30° C. or less, the resulting solid catalyst slurry was transferred to a SUS autoclave (inner volume: 150 L) equipped with a stirrer and liquid butane (100 L) was added, followed by preservation.

<Polymerization>

Two SUS fluidized bed reactors (inner volume: 1 m3) equipped with a stirrer were connected each other. Copolymerization of propylene and ethylene at the first-stage part (component A) and copolymerization of propylene and ethylene at the second-stage part (component B) are continuously conducted in the first reactor and second reactor, respectively.

(1) First reactor (component A part): In a fluidized bed reactor (inner volume: 1 m$^3$) equipped with a stirrer, copolymerization of propylene and ethylene was conducted in a polymer hold amount of a fluidized bed of 45 Kg by continuously feeding triethylaluminum (75 mmol/h), t-butyl-n-propyldimethoxysilane (7.5 mmol/h) and a preliminary activated solid catalyst component (0.29 g/h) with feeding propylene, ethylene and hydrogen so as to maintain the polymerization temperature of 70° C., polymerization pressure of 18 Kg/cm$^2$G, hydrogen concentration of the gas phase part of 0.20 vol % and ethylene concentration of the gas phase part of 2.4 vol % to obtain a polymer of 9.6 Kg/h. The resulting polymer was continuously transferred to the second reactor without being deactivated. A part of the polymer was sampled and analyzed. As a result, the ethylene content was 3.7% by weight and the intrinsic viscosity ([η]) in tetralin at 135° C. was 2.80 dl/g.

(2) Second reactor (component B part): In a fluidized bed reactor (inner volume: 1 m$^3$) equipped with a stirrer, a white polymer having good fluidity of 18.1 Kg/h was obtained by continuously copolymerizing ethylene and propylene of the catalyst-containing polymer transferred from the first reactor in a polymer hold amount of a fluidized bed of 80 Kg with feeding propylene, ethylene and hydrogen so as to maintain the polymerization temperature of 70° C., polymerization pressure of 12 Kg/cm$^2$G, hydrogen concentration of the gas phase part of 0.2 vol % and ethylene concentration of the gas phase part of 9.0 vol %. The ethylene content of the resulting polymer was 8.8% by weight and the intrinsic viscosity ([η]) in tetralin at 135° C. was 2.89 dl/g.

As is apparent from the above results, the polymerization ratio of the first reactor to the second reactor was 53:47 and the ethylene content of the component B part determined from the component A part and analytic value of the final polymer was 14.6% by weight and, further, the intrinsic viscosity ([η]) in tetralin at 135° C. was 3.0 dl/g.

To 100 parts by weight of this block copolymer powder were added 0.03 parts of calcium stearate, 0.2 parts by weight of Irganox 1010 (trade name) (manufactured by Ciba Geigy Ltd.) and 0.02 parts by weight of 5-dimethyl-2,5-di(tertiary-butylperoxy) hexane, followed by mixing with a Henschel mixer and further melt-kneading at 250° C. to adjust MFR to 2.6.

The polymerization conditions and results are shown in Table 1 and Table 2.

The resulting polymer was superior in flexibility, transparency and impact resistance at low temperature, as shown in Table 2.

Examples 2 to 4

According to the same manner as in Example 1, a polymer was produced under the conditions shown in Table 1 and MFR was optionally adjusted by changing the amount of 2,5-di(tert-butylperoxy)hexane to obtain a polymer having the structure shown in Table 2, respectively.

Comparative Examples 1, 2 and 4

According to the same manner as in Example 1, a polymer was produced under the conditions shown in Table 1 and MFR was optionally adjusted by changing the amount of 2,5-di(tertiary-butylperoxy)hexane to obtain a polymer having the structure shown in Table 2, respectively.

Comparative Example 3

According to the same manner as in Example 1 except for using only one fluidized bed reactor, a polymer was produced. The polymerization conditions are shown in Table 1.

Comparative Example 5

[Production of Polymer]

After the atmosphere in a SUS reactor (200 L) equipped with a stirrer was replaced with nitrogen, n-hexane (85 Kg), a high-active titanium trichloride catalyst (10 g, TLA-25 manufactured by Marubeni Solvay Co., Ltd.) and diethylaluminum chloride (DEAC, 1 mol) were added. Then, hydrogen (14 mL) and propylene (16 Kg) were charged and the temperature was raised to 55° C. After the temperature was raised, the pressure of the reactor was adjusted to 6 Kg/cm$^2$G with maintaining a feed ratio of propylene to ethylene to 97:3 in weight ratio. When the total feed amount of propylene and ethylene reached 16.0 Kg, the polymerization at the first-stage part was terminated and the pressure was decreased to 3 Kg/cm$^2$G, and then an aliquot (1.3 L) of the polymerized slurry was obtained. Immediately after sampling, solid-liquid phase separation was conducted and a solid polymer was recovered. Furthermore, after the temperature was adjusted to 50° C. and hydrogen (20 nL) was added, the pressure of the reactor was adjusted to 4.0 Kg/cm$^2$G with maintaining a feed ratio of propylene to ethylene to 85:15 in weight ratio. When the total feed amount of propylene and ethylene reached 11.5 Kg, the total amount of the slurry was transferred to a deactivation reactor (SUS container (300 L) equipped with a stirrer) into which 5 L of butanol was introduced, and then deactivated at 50° C. for 1 hour. The slurry was subjected to solid-liquid separation to recovery a white solid polymer (26.3 Kg). The polymer at the first-stage part was subjected to sampling and analysis. As a result, the intrinsic viscosity ([η]) in tetralin at 135° C. was 2.20 dl/g and the ethylene content was 2.9% by weight. The intrinsic viscosity ([η]) in tetralin at 135° C. of the resulting product was 2.4 dl/g and the ethylene content thereof was 6.5% by weight. The polymerization ratio of the first-stage part to the second-stage part was determined by material balance from the monomer feed amount. As a result, it was 60:40. Accordingly, the intrinsic viscosity ([η]) in tetralin at 135° C. of the polymer produced at the second-stage part was 2.7 dl/g and the ethylene content thereof was 12% by weight.

To 100 parts by weight of this block copolymer powder were added 0.03 parts of calcium stearate, 0.2 parts by weight of Irganox 1010 (trade name) (manufactured by Ciba Geigy Ltd.) and 0.01 parts by weight of 5-dimethyl-2,5-di (tertiary-butylperoxy)hexane, followed by mixing with a Henschel mixer and further melt-kneading at 250° C. to adjust MFR to 1.3.

The resulting polymer was inferior in flexibility and impact resistance at low temperature, as shown in Table 2.

Comparative Example 6

[Synthesis of Solid Catalyst]

After the atmosphere in a SUS reaction reactor (200 L) equipped with a stirrer was replaced with nitrogen, porous polymer beads (pore volume at pore radius of 200 to 2000 angstroms: 2.33 ml/g, average particle diameter: 35 μm) (73 L) composed of a copolymer of styrene and divinylbenzene, vacuum-dried at 100° C. for 6 hours, toluene (73 L), tetrabutoxytitanium (0.83 mol) and tetraethoxysilane (12.8 mol) were introduced, followed by stirring at 30° C. for 4 hours. Then, a diisobutyl ether solution (6.4 L) of n-butylmagnesium chloride (concentration: 2.0 mol/L) was added dropwise over 15 minutes with maintaining the temperature in the reactor at 5° C. After completion of the dropwise addition, the mixture was stirred at 5° C. for 45 minutes, stirred at 30° C. for 45 minutes, subjected to solid-liquid separation at room temperature to obtain a solid and then washed three times with toluene (40 L). After completion of washing, toluene (18.2 L) and diisobutyl phthalate (11 mol) were added and the reaction was conducted at 95° C. for 30 minutes. After the completion of the reaction, the reaction mixture was subjected to solid-liquid separation and washed twice with toluene (45 L). After completion of washing, toluene (18.5 L), n-butyl ether (1.7 mol), diisobutyl phthalate (1 mol) and titanium tetrachloride (332 mol) were added and the reaction was conducted at 95° C. for 3 hours. After completion of the reaction, the reaction mixture was subjected to solid-liquid separation at 95° C. to obtain a solid and washed three times with toluene (46 L) at the same temperature. After the above-mentioned treatment with a mixture of n-butyl ether, diisobutyl phthalate and titanium tetrachloride was conducted once again for 1 hour, the reaction solution was washed twice with n-hexane (46 L) and dried under reduced pressure to obtain 8.2 Kg of a solid catalyst component.

[Production of Polymer]

<Preliminary Activation of Solid Catalyst Component>

To a SUS autoclave (inner volume: 3 L) equipped with a stirrer, n-hexane (1.5 L) dehydrated and deaerated sufficiently, triethylaluminum (37.5 mmol), cyclohexylethyldimethoxysilane (3.75 mmol) and the above solid catalyst component (30 g) were added. After preliminary activation was conducted by continuously feeding propylene (3 g) over about 30 minutes with maintaining the temperature in the reactor at 30° C. or less, the resulting solid catalyst component was transferred to a SUS autoclave (inner volume: 150 L) equipped with a stirrer and liquid butane (100 L) was added, followed by preservation.

<Polymerization>

Two SUS fluidized bed reactors (inner volume: 1 m³) equipped with a stirrer were connected each other. Copolymerization of propylene and ethylene at the first-stage part (component A) and copolymerization of propylene and ethylene at the second-stage part (component B) are continuously conducted in the first reactor and second reactor, respectively.

(1) First reactor (component A part): In a fluidized bed reactor (inner volume: 1 m3) equipped with a stirrer, copolymerization of propylene and ethylene was conducted in a polymer hold amount of a fluidized bed of 65 Kg by continuously feeding triethylaluminum (50 mmol/h), cyclohexyldimethoxysilane (5 mmol/h) and a preliminary activated solid catalyst component (1.4 g/h) with feeding propylene, ethylene and hydrogen so as to maintain the polymerization temperature of 65° C., polymerization pressure of 18 Kg/cm²G, hydrogen concentration of the gas phase part of 0.5 vol % and ethylene concentration of the gas phase part of 2.2 vol % to obtain a polymer of 13.5 Kg/h. The resulting polymer was continuously transferred to the second reactor without being deactivated. An aliquot of the polymer was obtained and analyzed. As a result, the ethylene content was 3.5% by weight and the intrinsic viscosity ([η]) in tetralin at 135° C. was 2.2 dl/g.

(2) Second reactor (component B part): In a fluidized bed reactor (inner volume: 1 m3) equipped with a stirrer, a white polymer having good fluidity of 20.8 Kg/h was obtained by continuously copolymerizing ethylene and propylene of the catalyst-containing polymer transferred from the first reactor in a polymer hold amount of a fluidized bed of 40 Kg with feeding propylene, ethylene and hydrogen so as to maintain the polymerization temperature of 65° C., polymerization pressure of 12 Kg/cm²G, hydrogen concentration of the gas phase part of 1.2 vol % and ethylene concentration of the gas phase part of 18 vol %. The ethylene content of the resulting polymer was 10.7% by weight and the intrinsic viscosity ([η]) in tetralin at 135° C. was 2.34 dl/g.

As is apparent from the above results, the polymerization ratio of the first reactor to the second reactor was 63:25 and the ethylene content of the component B part determined from the component A part and analytic value of the final polymer was 24% by weight and, further, the intrinsic viscosity ([η]) in tetralin at 135° C. was 2.6 dl/g.

Comparative Example 7

According to the same manner as in Comparative Example 6, a polymer was produced under the conditions shown in Table 1, thereby obtaining a polymer having a structure shown in Table 2.

TABLE 1

| | | Polymerization conditions of first vessel (component A) | | | | | |
|---|---|---|---|---|---|---|---|
| Examples | Solid catalyst (g/h) | Polymerization temperature (° C.) | Pressure (Kg/cm²G) | Vapor phase part $H_2$ (%) | Vapor phase part $C'_2$ (%) | Polymer hold (Kg) | Produced polymer (Kg/h) |
| Example-1 | 0.29 | 70 | 18 | 0.17 | 2.4 | 45 | 9.6 |
| Example-2 | 0.24 | 70 | 18 | 2.2 | 3.4 | 45 | 11.9 |
| Example-3 | 0.26 | 70 | 18 | 0.2 | 3 | 45 | 12 |
| Example-4 | 0.24 | 70 | 18 | 1.9 | 3.1 | 45 | 10.8 |

TABLE 1-continued

| | | | | | | | |
|---|---|---|---|---|---|---|---|
| Comparative example-1 | 0.55 | 75 | 18 | 0.14 | 0 | 80 | 16.3 |
| Comparative example-2 | 0.45 | 75 | 18 | 0.2 | 0 | 80 | 13.9 |
| Comparative example-3 | 0.63 | 83 | 18 | 0.8 | 1.4 | 60 | 21.1 |
| Comparative example-4 | 0.26 | 70 | 18 | 3 | 1.4 | 45 | 11.5 |
| Comparative example-5 | | | Solvent/Batch (Solvay cat/DEAC) | | | | |
| Comparative example-6 | 1.4 | 65 | 18 | 0.5 | 2.2 | 65 | 13.5 |
| Comparative example-7 | 1.51 | 65 | 18 | 4.7 | 2.7 | 55 | 11.7 |

| Examples | Polymerization conditions of second vessel (component B) | | | | | | A/B, weight ratio (–) |
|---|---|---|---|---|---|---|---|
| | Polymerization temperature (°C.) | Polymerization temperature (Kg/cm²G) | Vapor phase part $H_2$ (%) | Vapor phase part $C'_2$ (%) | Polymer hold (Kg) | Finally produced polymer (Kg/h) | |
| Example-1 | 80 | 12 | 0.21 | 9 | 89 | 18.1 | 53/47 |
| Example-2 | 75 | 12 | 2.6 | 9.5 | 80 | 19.2 | 62/38 |
| Example-3 | 80 | 12 | 6.2 | 9.2 | 80 | 22 | 55/45 |
| Example-4 | 75 | 12 | 3.8 | 10.5 | 80 | 19 | 57/43 |
| Comparative examle-1 | 70 | 10 | 0.55 | 10 | 50 | 22.2 | 74/26 |
| Comparative example-2 | 70 | 10 | 0.95 | 26.7 | 45 | 19.3 | 72/28 |
| Comparative example-3 | — | — | — | — | — | — | 100/0 |
| Comparative example-4 | 75 | 14 | 1.5 | 9.5 | 80 | 20.6 | 56/44 |
| Comparative example-5 | | | | | | | |
| Comparative examle-6 | 65 | 12 | 1.2 | 17 | 40 | 20.8 | 65/35 |
| Comparative example-7 | 65 | 12 | 2.6 | 7.2 | 50 | 20.2 | 58/42 |

TABLE 2

| No. | | Component A | | | Component B | | | [η] B/A ratio | Difference in ethylene content % | MFR g/10 min. |
|---|---|---|---|---|---|---|---|---|---|---|
| | | [η] dl/g | $C_2$ wt % | Content wt % | [η] dl/g | $C_2$ wt % | Content wt % | | | |
| 1 | Example-1 | 2.8 | 3.7 | 53 | 3 | 14.6 | 47 | 1.07 | 11.3 | 2.6 |
| 2 | Example-2 | 2 | 5 | 62 | 2 | 14 | 38 | 1 | 9 | 2.3 |
| 3 | Example-3 | 3.6 | 4.5 | 55 | 4.7 | 14 | 45 | 1.31 | 6.5 | 0.1 |
| 4 | Example-4 | 2.4 | 4.7 | 57 | 2.3 | 16 | 43 | 0.96 | 12.4 | 2.6 |
| 5 | Example-5 | 2.8 | 3.6 | 76 | 3 | 14.6 | 24 | 1.1 | 11.4 | 7.3 |
| 6 | Comparative example-1 | 3.1 | 0 | 74 | 3.2 | 15 | 26 | 1.1 | 15 | 2.3 |
| 7 | Comparative example-2 | 2.9 | 0 | 72 | 3.3 | 34 | 28 | 1.1 | 34 | 2.3 |
| 8 | Comparative example-3 | 1.99 | 2.9 | 100 | — | 0 | 0 | — | — | 2.7 |
| 9 | Comparative example-4 | 1.6 | 2.5 | 56 | 5.5 | 15 | 43 | 3.4 | 12.5 | 0.6 |
| 10 | Comparative example-5 | 2.5 | 2.9 | 60 | 2.7 | 12 | 40 | 1.08 | 8.7 | 1.3 |
| 11 | Comparative example-6 | 2.2 | 3.5 | 65 | 2.7 | 24 | 35 | 1.2 | 20.2 | 1.5 |
| 12 | Comparative example-7 | 1.2 | 4.9 | 58 | 1.9 | 17.8 | 42 | 1.6 | 20.2 | 1.5 |

TABLE 2-continued

| No. | | Melting point °C. | Flexural modulus kg/cm² | Press sheet (1 mm) | | Film (30μ) | | Low-molecular weight component |
|---|---|---|---|---|---|---|---|---|
| | | | | Haze % | Izod Impact 0° C. | Haze % | Impact −10° C. | |
| 1 | Example-1 | 147 | 3600 | 50 | 124 | 3.5 | 120 | ○ |
| 2 | Example-2 | 131 | 3500 | 33 | 77 | 3.2 | >130 | Δ |
| 3 | Example-3 | 136 | 3200 | 62 | 141 | 3 | >130 | ○ |
| 4 | Example-4 | 131 | 3800 | 43 | 107 | 2.3 | >130 | Δ |
| 5 | Example-5 | 135 | 6800 | — | — | 3.7 | 60 | ○ |
| 6 | Comparative example-1 | 160 | 8700 | — | — | 5 | 15 | — |
| 7 | Comparative example-2 | 160 | 8200 | — | — | 39 | >130 | — |
| 8 | Comparative example-3 | 142 | 10000 | 57 | 2 | — | — | — |
| 9 | Comparative example-4 | 140 | 3000 | 81 | 100 | — | — | — |
| 10 | Comparative example-5 | 152 | 8000 | — | — | 20 | 8 | — |
| 11 | Comparative example-6 | 134 | 2500 | 97 | NB | — | — | — |
| 12 | Comparative example-7 | 134 | 2500 | 97 | NB | — | — | X |

The polypropylene block copolymer of the present invention has good flexibility and transparency as well as excellent impact resistance at low temperature.

What is claimed is:

1. A polypropylene block copolymer comprising components A and B which is obtained by:

producing an ethylene-propylene copolymer moiety as a component A having an ethylene content of 1.5 to 6.0% by weight in the absence of an inert solvent in a first step, with a Ziegler-Natta catalyst, and then producing an ethylene-propylene copolymer moiety as the component B having an ethylene content of 7 to 17% by weight in a gas phase in a second step, wherein component A is present in the copolymer in an amount of 40 to 85% by weight and component B present in the copolymer in an amount of 15 to 60% by weight based on the total of components A and B; the intrinsic viscosity ($(\eta)B$) of the component B is from 2.0 to 5.0 dl/g and the ratio ($(\eta)B/(\eta)A$) of the intrinsic viscosity ($(\eta)B$) of the component B to the intrinsic viscosity ($(\eta)A$) of the component A is within the range of 0.5 to 1.8, the intrinsic viscosity being measured in tetralin at 135° C.; and wherein the difference (EB−EA) between the ethylene content of the component B in percent by weight (EB) and the ethylene content of the component A in percent by weight (EA) is 3 to 15% by weight.

2. A polypropylene block copolymer according to claim 1, wherein the Ziegler-Natta catalyst is a catalyst comprising at least titanium, magnesium and halogen as essential components.

3. A polypropylene block copolymer according to claim 1, wherein a content of a component having a molecular weight of not more than 26000 as a soluble fraction in xylene at 20° C. in the propylene block polymer is not more than 6% by weight.

4. A polypropylene block copolymer according to claim 1, wherein the difference (EB−EA) is 5 to 10% by weight.

5. A polypropylene block copolymer according to claim 1, wherein the ethylene content of component (A) is 2.5 to 4.5% by weight.

6. A polypropylene block copolymer according to claim 1, wherein the ethylene content of component (B) is 8 to 12% by weight.

7. A polypropylene block copolymer according to claim 1, wherein the intrinsic viscosity ($[\eta]B$) of the component B is from 2.5 to 4.5 dl/g.

8. A polypropylene block copolymer according to claim 1, wherein the ratio ($[\eta]B/[\eta]A$) of the intrinsic viscosity ($[\eta]B$) of the component (B) to the intrinsic viscosity ($[\eta]A$) of the component (A) is within the range of 0.8 to 1.5.

9. A molded article obtained by molding the polypropylene block copolymer of claim 1.

10. A molded article obtained by molding the polypropylene block copolymer of claim 2.

11. A molded article obtained by molding the polypropylene block copolymer of claim 3.

12. A molded article obtained by molding the polypropylene block copolymer of claim 4.

13. A molded article obtained by molding the polypropylene block copolymer of claim 6.

14. A molded article obtained by molding the polypropylene block copolymer of claim 7.

15. A molded article obtained by molding the polypropylene block copolymer of claim 8.

* * * * *